Patented Sept. 29, 1925.

1,555,223

UNITED STATES PATENT OFFICE.

EMIL LÜSCHER AND THEODOR LICHTENHAHN, OF BASEL, SWITZERLAND, ASSIGNORS TO ELEKTRIZITATSWERK LONZA, OF BASEL, SWITZERLAND, A COMPANY OF SWITZERLAND.

MANUFACTURE OF METALDEHYDE.

No Drawing.  Application filed August 8, 1922. Serial No. 580,540.

*To all whom it may concern:*

Be it known that we, EMIL LÜSCHER and THEODOR LICHTENHAHN, both citizens of the Swiss Republic, and residents of Basel, Switzerland, have invented new and useful Improvements in the Manufacture of Metaldehyde, of which the following is a full, clear, and exact specification.

Metaldehyde is produced when catalyzers are allowed to act on acetaldehyde at temperatures below 10° centigrade, preferably at zero centigrade, or lower. According to the literature (see, for example, Beilstein's "Handbuch der Organischen Chemie," third edition, volume 1, page 917) acids, and also calcium chloride in lumps, constitute such catalyzers. At the same time, and indeed primarily, the acids are paraldehyde catalyzers, their action on acetaldehyde yielding mainly paraldehyde, together with metaldehyde in but small quantities.

Even at low temperatures, the final equilibrium between the three polymers, acetaldehyde, paraldehyde and metaldehyde, inclines so far in favour of paraldehyde that the final liquid contains over 90 per cent of paraldehyde with acetaldehyde, and with a quantity of metaldehyde so small that it remains in solution. It is only for a limited period during the transformation that the metaldehyde is obtained to such an amount as to exceed the limit of its solubility in the mixture and appear in the solid form but disappearing again, as the action continues. This period must be utilized to separate it from the liquid and withdraw it from the influence of the catalyzer. Even then, according to existing publications, not more than 1.8 grammes of metaldehyde can be recovered from 100 grammes of acetaldehyde, which is too small an amount to make the process commercially available.

The problem has therefore been to find what catalyzers will accelerate the production of metaldehyde more rapidly relatively to the production of paraldehyde, and to a greater extent than is effected when using the catalyzers hitherto employed and especially the acids which have up to now almost exclusively been used as catalyzers.

We have found that certain metal bromides capable of an aldehydolytic splitting off of hydrobromic acid, as for instance lithium bromide, calcium bromide or another alkalki earth bromide, possess the required property. By this aldehydolytic splitting off of hydrobromic acid, we understand a partial decomposition of a metal bromide, which takes place when the haloid salt comes into contact with aldehyde and which may be represented for instance by the formula $$mLiBr + CH_3COH = (m-1)LiBr + HBr + CH_3COLi,$$

that is to say, a phenomenon analogous to that of the hydrolysis occurring in presence of water. By means of calcium bromide for example it has been found possible to separate and recover 4 to 8 per cent of metaldehyde in the solid form.

All the catalyzers employed as aforesaid give the maximum yield when the temperature of the reaction liquid is maintained below 10° centigrade during the process.

The following is an example of how this invention can be performed, but the invention is not limited to this example.

Acetaldehyde, cooled down to about zero centigrade, is treated according to this invention with a few hundredths of one per cent calcium bromide. A crystalline deposit, consisting of metaldehyde, quickly forms and is obtained by filtering. The filtrate consists mainly of paraldehyde and can be transformed again to acetaldehyde by the action of catalyzers at higer temperatures. The yield obtained varies from 4 to 8 per cent.

What we claim is:

1. An improvement in the manufacture of metaldehyde from acetaldehyde consisting in the employment as catalyst of a small quantity of a metal bromide capable of an aldehydolytic splitting off of hydrobromic acid.

2. An improvement in the manufacture of metaldehyde from acetaldehyde consisting in the employment as catalyst of a small quantity of the bromide of an alkali-earth metal.

3. An improvement in the manufacture of metaldehyde from acetaldehyde consisting in the employment as catalyst of a small quantity of calcium bromide.

In witness whereof we have hereunto signed our names this 14th day of July, 1922.

EMIL LÜSCHER.
THEODOR LICHTENHAHN.